United States Patent
Shapiro et al.

(10) Patent No.: US 12,529,611 B2
(45) Date of Patent: Jan. 20, 2026

(54) INSTRUMENTED PIN SENSOR

(71) Applicant: STRAIN MEASUREMENT DEVICES, INC., Wallingford, CT (US)

(72) Inventors: Daniel Shapiro, Brandford, CT (US); Neal Wostbrock, North Haven, CT (US); William Easlea, Suffolk (GB); Eduard Krutyanskiy, Middlebury, CT (US); Chris Bowman, Suffolk (GB)

(73) Assignee: Strain Measurement Devices, Inc., Wallingford, CT (US)

( * ) Notice: Subject to any disclaimer, the term of this patent is extended or adjusted under 35 U.S.C. 154(b) by 478 days.

(21) Appl. No.: 17/992,193

(22) Filed: Nov. 22, 2022

(65) Prior Publication Data

US 2024/0167897 A1    May 23, 2024

(51) Int. Cl.
   *G01L 1/22*    (2006.01)
(52) U.S. Cl.
   CPC .................. *G01L 1/2225* (2013.01)
(58) Field of Classification Search
   CPC ....... G01L 1/2225; G01L 1/22; G01L 1/2206; G01L 1/2218
   See application file for complete search history.

(56) References Cited

U.S. PATENT DOCUMENTS

| | | | |
|---|---|---|---|
| 4,858,475 A * | 8/1989 | Jacobson | G01L 1/2225 73/862.642 |
| 6,769,315 B2 | 8/2004 | Stevenson et al. | |
| 8,474,326 B2 * | 7/2013 | Kempainen | G01L 1/2225 73/856 |
| 8,561,472 B2 * | 10/2013 | Sauder | G01L 5/136 73/760 |
| 10,548,254 B2 * | 2/2020 | Sauder | G01L 5/0038 |
| 2010/0000336 A1 * | 1/2010 | Claxton | G01L 5/101 73/862.474 |
| 2018/0235822 A1 * | 8/2018 | Wako | G01L 1/2225 |

FOREIGN PATENT DOCUMENTS

| | | | | |
|---|---|---|---|---|
| CN | 104655335 | * | 5/2015 | |
| CN | 114729831 | * | 7/2022 | ............. G01G 19/14 |
| DE | 102020114431 | * | 3/2021 | |
| GB | 1577341 | | 10/1980 | |

OTHER PUBLICATIONS

CN-104655335 translation (Year: 2015).*
DE-102020114431 translation (Year: 2021).*
CN-114729831 translation (Year: 2022).*

* cited by examiner

*Primary Examiner* — Kyung S Lee

(57) ABSTRACT

An instrumented pin sensor includes: a support body in the form of a pin having an axial cross section that is only partially circular, forming a first outer surface with a profile that follows the partially circular axial cross section, and a second outer surface with a profile that does not follow the partially circular axial cross section; a strain sensing electrical circuit having at least one strain sensing gauge, the strain sensing electrical circuit fixedly disposed on the second outer surface; a plurality of electrical leads having a first end electrically connected to the strain sensing electrical circuit and fixedly attached to the second outer surface of the support body, and a second end extending from the support body; wherein the second outer surface runs the entire length of the support body with material of the support body only on an underside of the second outer surface.

28 Claims, 14 Drawing Sheets

(View 4B-4B)

(View 4D-4D)

INSTRUMENTED PIN SENSOR

BACKGROUND

The present disclosure relates generally to a sensor, particularly to a pin sensor, and more particularly to an instrumented pin sensor.

Force measurement on articulating components is desirable to determine the loads that are placed on and generated by these articulating components. For example, many hand-held devices such as surgical instruments or automated devices such as robotic arms require control or feedback that is dependent on the measured force. This force measurement can be challenging because the articulating components do not always provide a means for convenient sensing regions to apply load sensors such as strain gauges or load cells. A common design element in articulating components is a hinge point that articulates on a pin. During articulation the pin experiences mechanical forces. Pin sensors are known in the art. These prior art sensors typically have multiple components that make up their structure. Some of these prior art sensors use bonded foil strain gauges that require an adhesive interface between the foil strain gauge and the sensor pin. These types of pin sensor assemblies are susceptible to environmental performance degradation due to humidity, heat and chemicals. To protect the foil gauges, some prior art pin sensors incorporate additional structures and features such as outer housings and inner conduits to protect the sensing circuitry and electrical wires or leadouts.

Although existing pin-type sensors have been in use for some time, their fundamental designs have limited their minimum size. As a result, they have not been used in miniature assemblies that also require environmental protection. Prior art pin sensors have typically used bonded foil strain gauges with electrical interconnections that require rugged mechanical protection to withstand the environments of use. Many of these prior art pin sensors have been fabricated from hollow cylinders to provide a protected "tunnel" for the wires or leadouts to make electrical connections between the pin sensor and the instrumented component. The fabrication of these sensors have typically required the precise assembly of multiple components to protect the sensors and leadouts from the local environment in which they are used.

The following publications may be considered as useful background art: GB1577341A, Shear Pin Load Cell Load Measuring Equipment, document available at https://patentimages.storage.googleapis.com/a0/20/db/c51eef361146e4/GB1577341A.pdf; U.S. Pat. No. 6,769,315, Shackle Pin with Internal Signal Conditioner, document available at https://patentimages.storage.googleapis.com/38/fb/ef/411eda3a0febab/US6769315.pdf; and, U.S. Pat. No. 8,561,472 B2, Load Sensing Pin, document available at https://patentimages.storage.googleapis.com/fe/f1/a5/762e7cda3b89fa/US8561472.pdf.

The following websites may be considered as useful background art: https://www.strainsert.com/product-catagories/load-ping/; https://www.futek.com/store/null/LLP/load-pin-LLP400/FSH02849; https://www.omega.com/en-us/force-strain-measurement/load-cells/p/LCP-SERIES; https://www.stellartech.com/sti-products/clevis-pin-load-cells/; and, https://www.flintec.com/weight-sensors/force-sensors/load-pins.

While existing pin sensors may be suitable for their intended purpose, the art relating to force measurement on articulating components would be advanced with a pin sensor that does not require special consideration of the articulating components such as arms on an articulating instrument or arm, and overcomes other drawbacks of the prior art pin sensors in a compact design.

BRIEF SUMMARY

An embodiment includes an instrumented pin sensor as defined by the appended independent claim(s). Further advantageous modifications of the instrumented pin sensor are defined by the appended dependent claims.

In an embodiment, an instrumented pin sensor includes: a support body in the form of a pin, the pin having an axial cross section that is only partially circular, forming a first outer surface with a profile that follows the partially circular axial cross section, and a second outer surface with a profile that does not follow the partially circular axial cross section; a strain sensing electrical circuit having at least one strain sensing gauge, the strain sensing electrical circuit fixedly disposed on the second outer surface of the support body; a plurality of electrical leads having a first end electrically connected to the strain sensing electrical circuit and fixedly attached the second outer surface of the support body, and a second end extending from the support body and being configured to provide electrical transmission of electrical signals from the strain sensing electrical circuit to an end user instrument; wherein the second outer surface runs the entire length of the support body with material of the support body only on an underside of the second outer surface.

The above features and advantages and other features and advantages of the invention are readily apparent from the following detailed description of the invention when taken in connection with the accompanying drawings.

BRIEF DESCRIPTION OF THE DRAWINGS

Referring to the exemplary non-limiting drawings wherein like elements are numbered alike in the accompanying Figures.

Figure 1A:
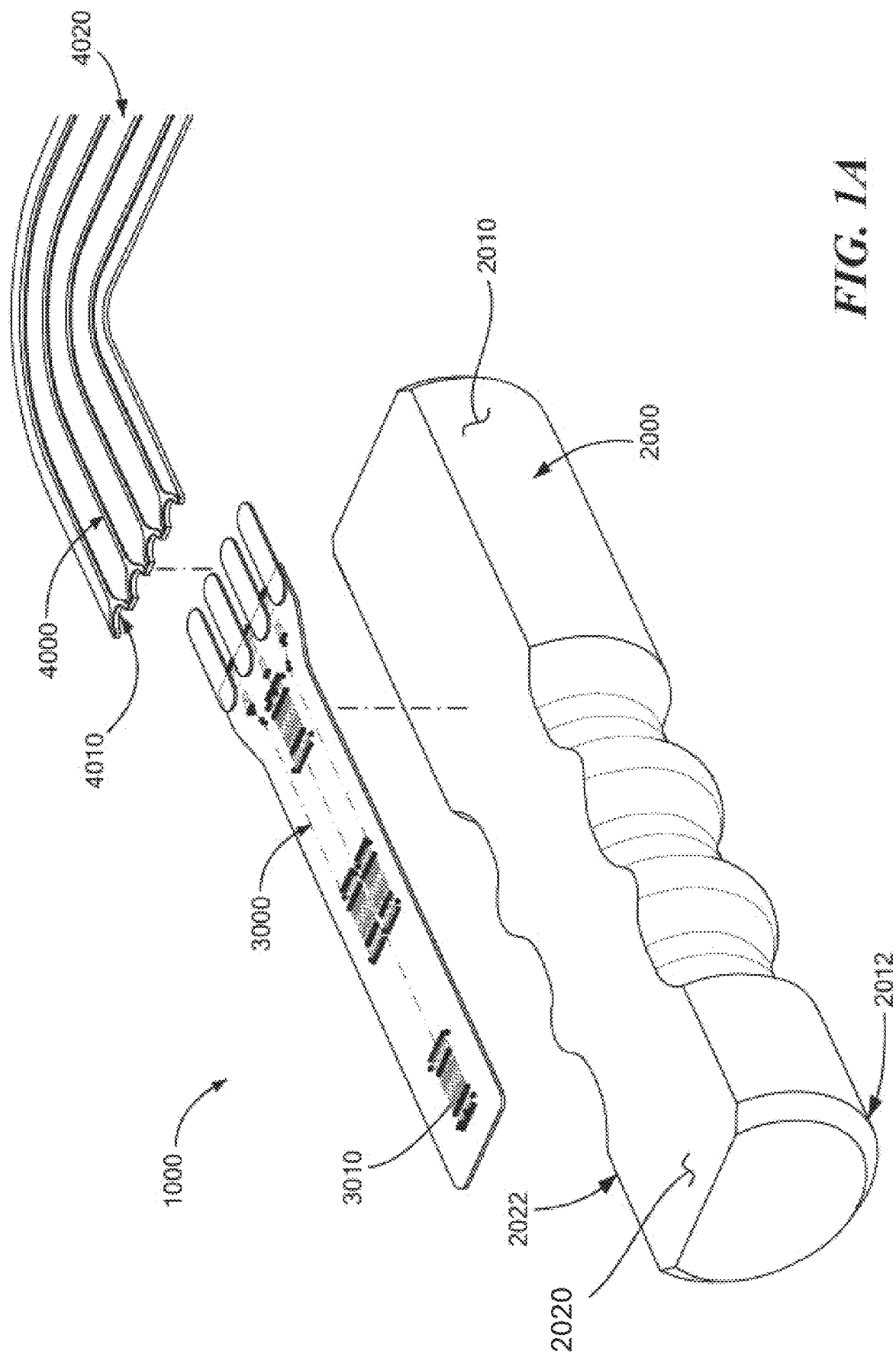
FIGS. 1A and 1B respectively depict; a rotated isometric view of a disassembled assembly, and a rotated isometric view of an assembled assembly, of an example instrumented pin sensor, in accordance with an embodiment.

One skilled in the art will understand that the drawings, further described herein below, are for illustration purposes only. It will be appreciated that for simplicity and clarity of illustration, elements shown in the figures have not necessarily been drawn to scale. For example, the dimensions or scale of some of the elements may be exaggerated relative to other elements for clarity. Further, where considered appropriate, reference numerals may be repeated among the figures to indicate corresponding or analogous elements, or analogous elements may not be repetitively enumerated in all figures where it will be appreciated and understood that such enumeration where absent is inherently disclosed.

DETAILED DESCRIPTION

As used herein, the phrase "embodiment" means "embodiment disclosed and/or illustrated herein", which may not necessarily encompass a specific embodiment of an invention in accordance with the appended claims, but nonetheless is provided herein as being useful for a complete understanding of an invention in accordance with the appended claims.

Although the following detailed description contains many specifics for the purposes of illustration, anyone of ordinary skill in the art will appreciate that many variations and alterations to the following details are within the scope of the appended claims. For example, where described features may not be mutually exclusive of and with respect to other described features, such combinations of non-mutually exclusive features are considered to be inherently disclosed herein. Additionally, common features may be commonly illustrated in the various figures but may not be specifically enumerated in all figures for simplicity, but would be recognized by one skilled in the art as being an explicitly disclosed feature even though it may not be enumerated in a particular figure. Accordingly, the following example embodiments are set forth without any loss of generality to, and without imposing limitations upon, the claimed invention disclosed herein.

In an embodiment, an instrumented pin sensor is provided that can measure forces on a pin, which may be an articulated pin, such as a hinged pin or a roller pin for example, or a stationary non-articulating pin, such as a pivot pin in a roller, a pulley, a capstan, a clevis, or any other device or assembly where an instrumented pin or shear pin would be of benefit, for example. Such a pin provides a compact force sensing solution in a device under measurement, and particularly in the hinge of a device under measurement.

In an embodiment, the instrumented pin sensor can be a single component, or can be integrated into other components as part of a subassembly. In an embodiment, the instrumented pin sensor is a stainless-steel pin that has a flat machined side on one side. This flat area (described further herein below) is used as the surface upon which strain sensing circuitry is placed, the gauged surface. In an embodiment, the instrumented pin sensor has strain focusing features that allows the strain sensing circuitry to measure and transmit an electrical signal that is proportional to the load on the pin. In an embodiment, the strain sensing circuitry is protected by specified processing techniques that allow it to resist high temperatures and corrosive environments. In addition, the instrumented pin sensor includes features that allow for the attachment of electrical leads to transmit the signal.

In an embodiment, the instrumented pin sensor is composed of three main parts: a support body in the form of a pin, a strain sensing electrical circuit in the form of a strain gauge, and, electrical wires or leadouts configured to electrically connect to an instrument component. The pin provides a mechanical support for fixed or articulating components, a surface for including a strain gauge, and cutout outs or other features to create custom strain profiles; the strain gauge contains sensor circuitry, protective coatings, adhesives, laminates, microcircuitry and/or interconnect features; and, the leadouts provide for electrical power to transmit signals from the strain gauge to an instrument component.

Figure 1B:
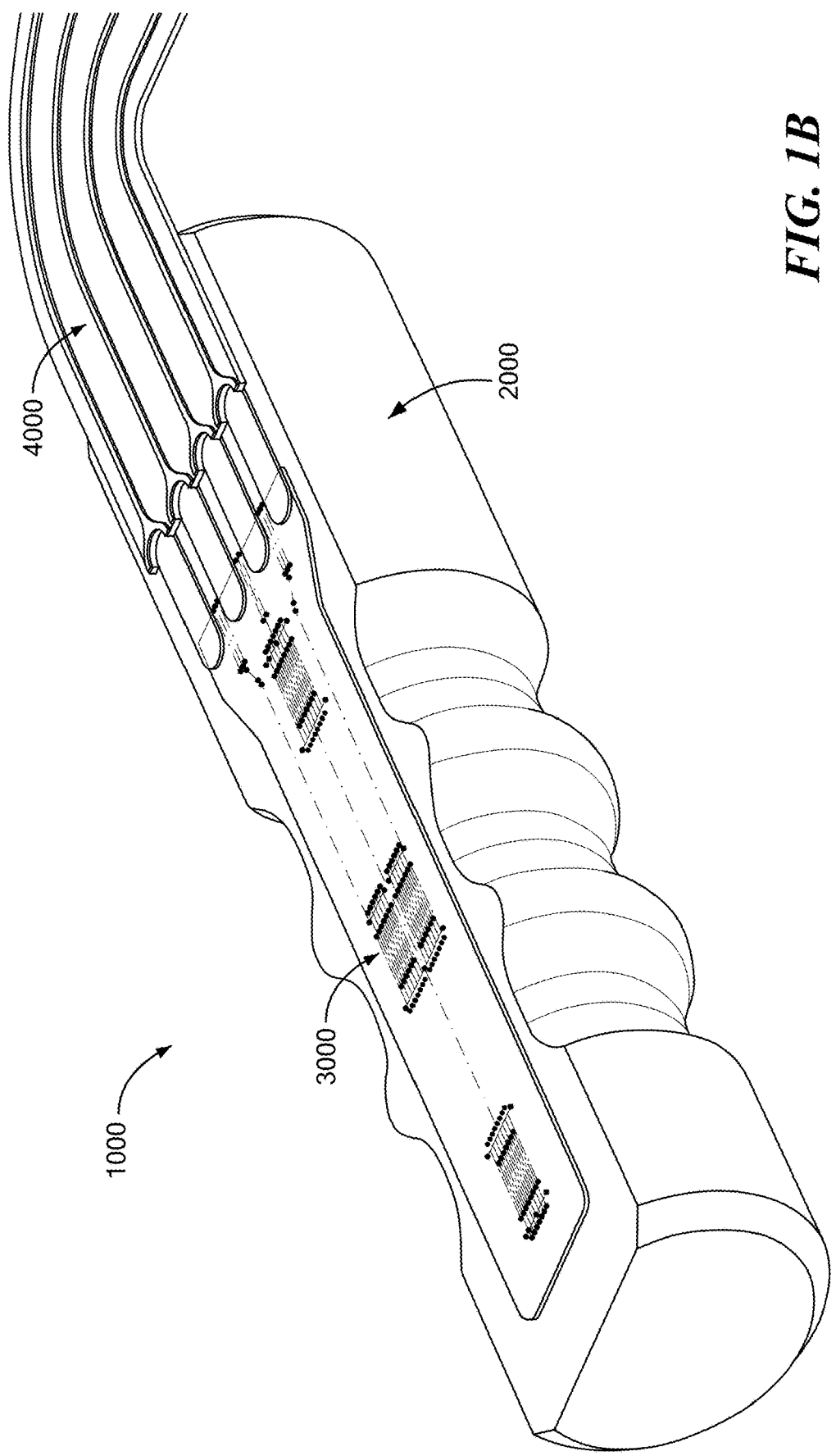

With respect to the three main parts, reference is now made to FIGS. 1A and 1B in combination, where FIG. 1A depicts a rotated isometric view of a disassembled assembly, and FIG. 1B depicts a rotated isometric view of an assembled assembly, of an instrumented pin sensor 1000 having a support body 2000 in the form of a pin (also herein referred to by reference numeral 2000).

As depicted, the pin 2000 has an axial cross section that is only partially circular, such as D-shaped for example, forming a first outer surface 2010 with a profile that follows the partially circular axial cross section, depicted as a rounded bottom portion 2012 of the pin 2000 for example, and a second outer surface 2020 with a profile that does not follow the partially circular axial cross section, depicted as a flat upper surface 2022 of pin 2000 for example. In an embodiment, the pin 2000 serves as a mechanical hinge point or axle in articulating and non-articulating machine components and assemblies. The pin 2000 can be made in a large range of sizes, but is also advantageous in the ability of the pin 2000 to be miniaturized for very small assemblies.

As depicted, the instrumented pin sensor 1000 includes a strain sensing electrical circuit 3000 having at least one strain sensing gauge 3010, wherein the strain sensing electrical circuit 3000 is fixedly disposed on the second outer surface 2020, the gauged surface, of the support body 2000. In an embodiment, each one of the at least one strain sensing gauge 3010 of the strain sensing electrical circuit 3000 is disposed only on the second outer surface 2020. In an embodiment, each strain sensing gauge 3010 consists of a thin film strain gauge which can be created on the pin 2000 in a cleanroom environment under vacuum by means of sputter deposition and subsequent laser trimming to form the circuit of a Wheatstone bridge. Other types of strain sensors may be used in similar applications as disclosed herein, including bonded foil strain gauges, optical strain sensors, capacitive sensors, and silicon sensors, but such strain sensors may not have all of the advantages of an embodiment disclosed herein and in accordance with one or more or all of the appended claims.

In an embodiment, a plurality of electrical leads (leadouts) 4000 have a first end 4010 that is electrically connected to the strain sensing electrical circuit 3000 and fixedly attached to the second outer surface 2020 of the support body 2000, and a second end 4020 that extends from the support body 2000 and is configured to provide electrical transmission of electrical signals from the strain sensing electrical circuit 3000 to an end user instrument component (not specifically shown, but known in the art) for reading of the electrical signals. In an embodiment, the second outer surface 2020 runs the entire length, L, of the support body 2000 with material of the support body 2000 only on an underside of the second outer surface 2020 between the first outer surface 2010 and the second outer surface 2020. That is, in an embodiment, solid material of the support body 2000 exists only between the first outer surface 2010 and the second outer surface 2020 within the length L of the support body 2000. In an embodiment, the leadouts 4000 provide the electrical connection to the strain sensing electrical circuit 3000. The electrical leadouts 4000 not only must function as electrical connections, but also must not inhibit the function of the instrumented component 5000 (see FIG. 2) to which the instrumented pin sensor 1000 is attached. In an embodiment, the support body (pin) 2000 is a solid-bodied pin absent any through holes and/or a longitudinal bore, which if present may potentially be utilized for passage of the leadouts 4000.

Figure 2:
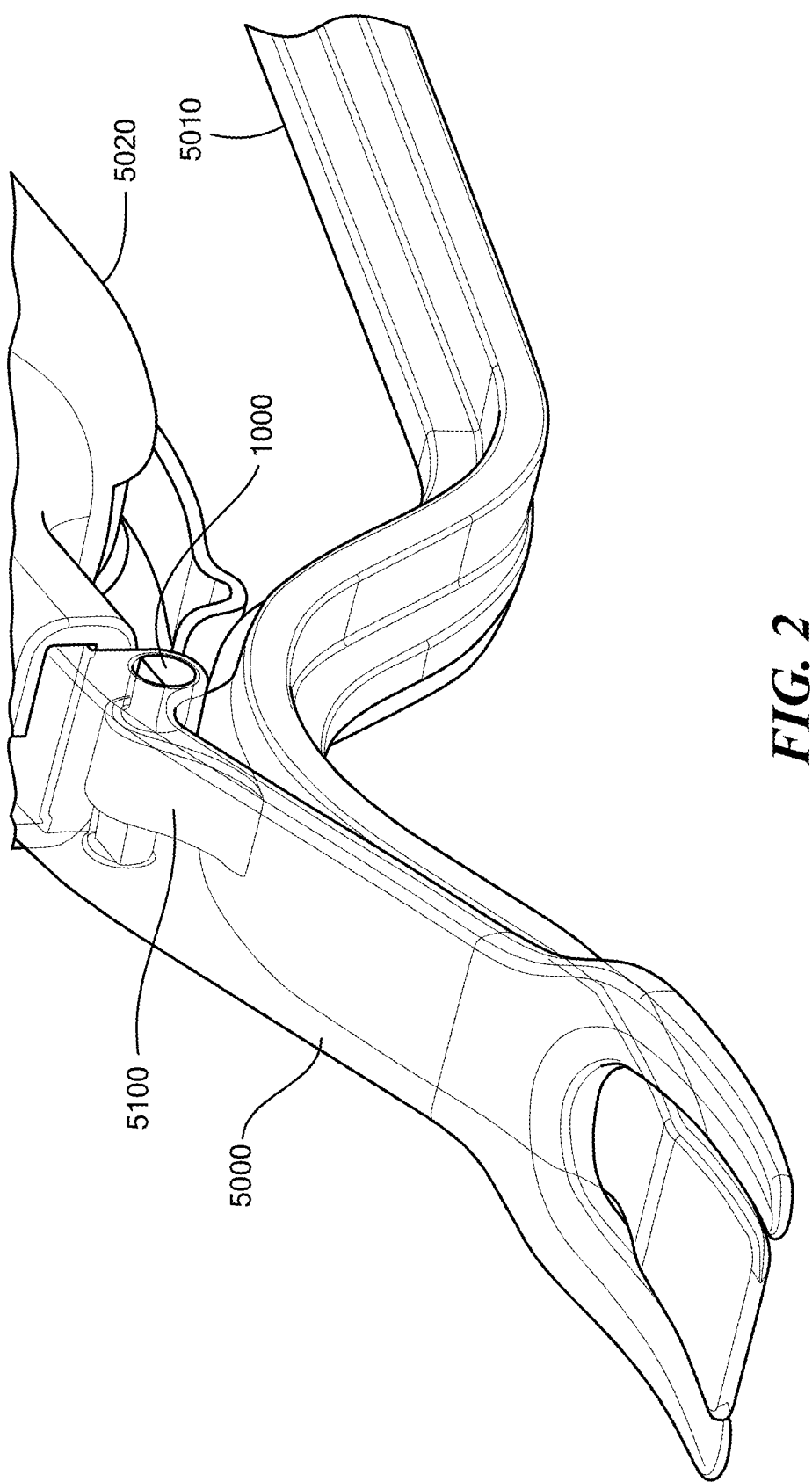
FIG. 2 depicts an example instrumented component having the instrumented pin sensor of FIG. 1A disposed in a hinge location between two members that are movable relative to each other, in accordance with an embodiment.

FIG. 2 depicts an example instrumented component 5000 having the instrumented pin sensor 1000 disposed in a hinge location 5100 between two member 5010, 5020 that are movable relative to each other, and in an application exert a force or forces on the instrumented pin sensor 1000 that are of interest for being measured.

Figure 3C:
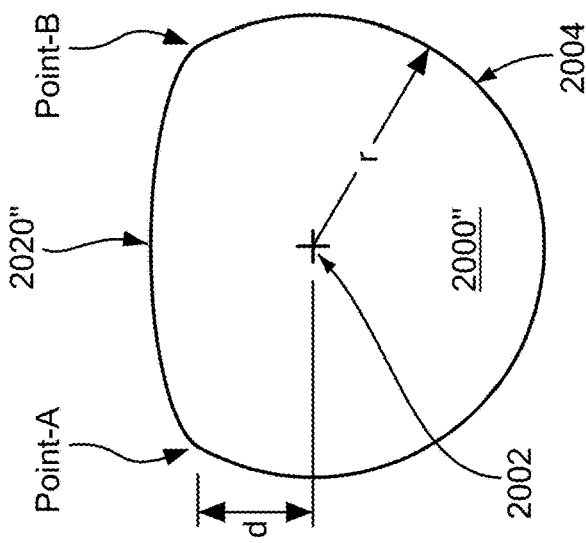
FIGS. 3A, 3B, and 3C, depict alternative configurations for the gauged surface, a second outer surface, of the instrumented pin sensor of FIG. 1A, in accordance with an embodiment.
Figure 3B:
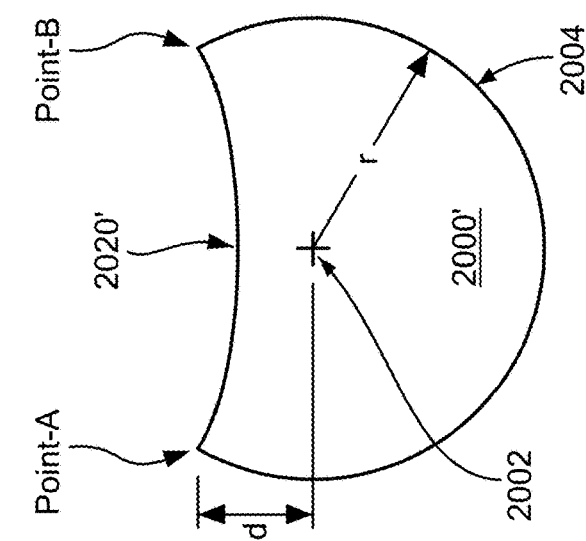
Figure 3A:
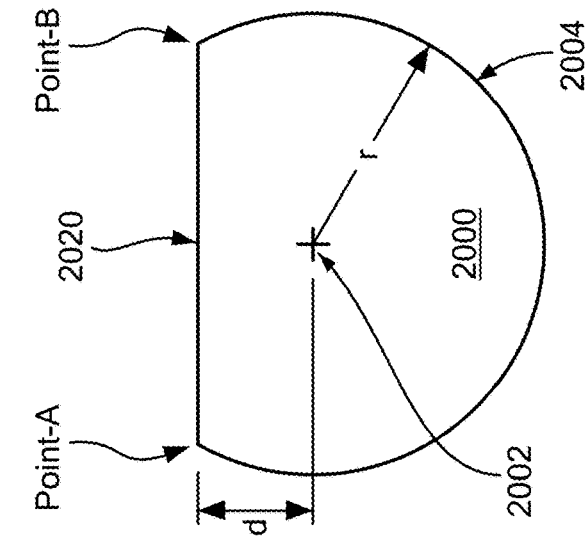

In an embodiment, the second outer surface 2020 of the pin 2000 is a planar surface, as depicted in FIGS. 1A and 1B, and also as depicted in the axial cross section view of the pin 2000 in FIG. 3A. However, an embodiment also encompasses a construct where the second outer surface 2020 of the pin 2000 is not a planar surface, but may be a concave surface 2020' as depicted in the axial cross section view of the pin 2000' in FIG. 3B, or a convex surface 2020" as depicted in the axial cross section view of the pin 2000" in FIG. 3C.

As depicted in FIGS. 3A-3C, the second outer surface (generally referred to by reference numeral 2020) is offset from the center 2002 of the pin (generally referred to by reference numeral 2000) toward an outer circumference 2004 of the pin 2000 by a defined dimension "d", which provides for sufficient circumferential engagement of the pin 2000 with the instrumented component 5000 for the pin 2000 to be sufficiently restrained from radial movement for the purpose of instrumentation as disclosed herein. In and embodiment, dimension "d" is greater than zero and less than the radius "r" of the pin 2000. In an embodiment, d is greater than zero and equal to or less than 0.75r, alternatively d is greater than zero and equal to or less than 0.5r, further alternatively d is greater than zero and equal to or less than 0.25r, yet further alternatively d is greater than zero and equal to or less than 0.1r. As depicted in FIGS. 3A-3C, an embodiment of the outer circumference 2004 of the first outer surface 2010 of the pin 2000 has a profile that follows a partially circular axial cross section of the pin 2000 that is formed by an angle of arc, as observed in the axial cross section of FIGS. 3A-3C, that is greater than 180-degrees and less than 360-degrees from Point-A to Point-B through the material of the pin 2000.

Figures 4A, 4B:
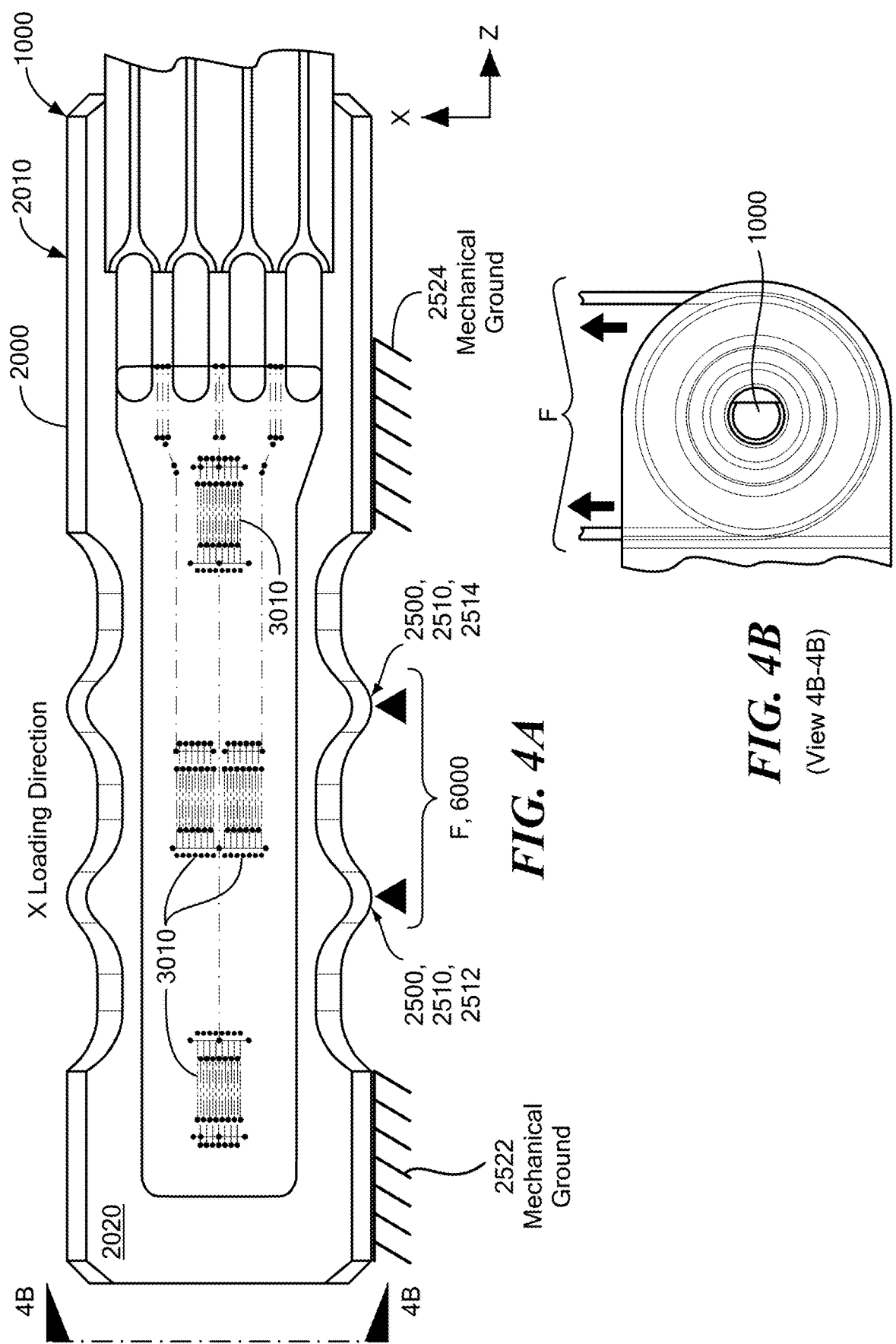
FIG. 4A depicts a top down plan view.
FIG. 4B depicts an axial end view, of an X-loading condition of the instrumented pin sensor of FIG. 1A, where the applied force is transverse or parallel to the strain gauges, in accordance with an embodiment.
Figure 4C:
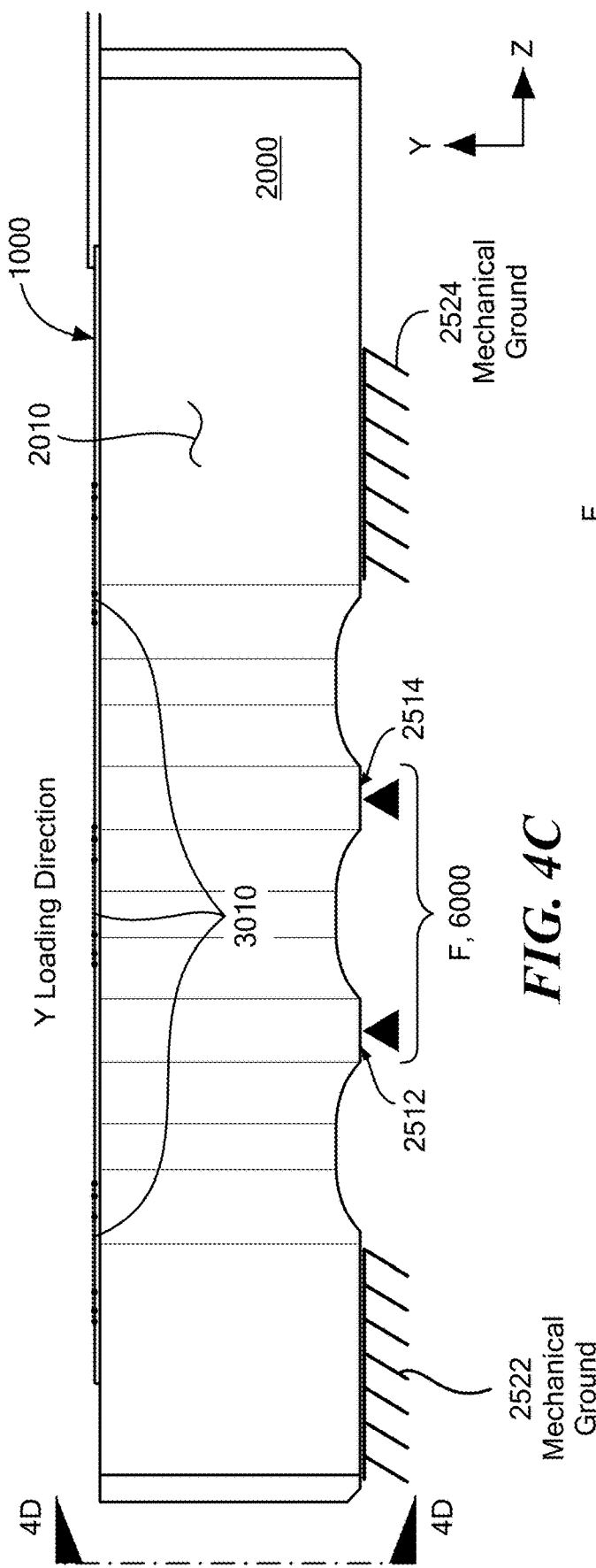
FIGS. 4C and 4E each depict a side view.
Figure 4D:
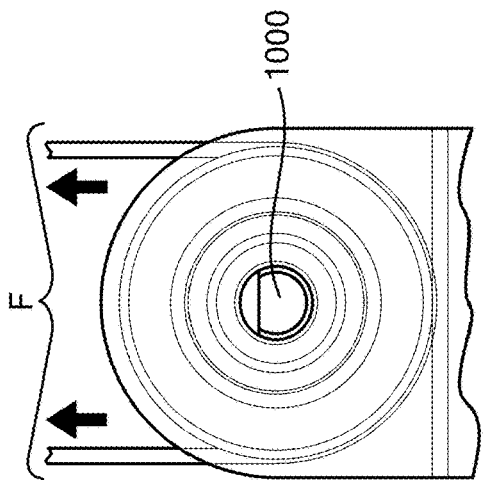
FIG. 4D depicts an axial end view, of a Y-loading condition of the instrumented pin sensor of FIG. 1A, where the applied force is normal or perpendicular to the strain gauges, the instrumented pin sensor depicted in FIG. 4E is identical to that of FIG. 4C and is provided herewith merely for clarity of discussion, in accordance with an embodiment.

Reference is now made to FIGS. 4A-4D collectively, where FIGS. 4A and 4B depict an X-loading condition where the applied force, F, is transverse or parallel to the strain gauges 3010, and FIGS. 4C and 4D depict a Y-loading condition where the applied force, F, is normal or perpendicular to the strain gauges 3010, on the instrumented pin sensor 1000. These two loading arrangements produce different strain profiles across the pin 2000 and these strain profiles in turn produce different electrical signals that can be characteristic of the loading arrangement. The different strain profiles from the x and y directions can be measured by strain gauges 3010 placed on the specific regions of x and y strain, see FIGS. 5A and 6A for example. The specific regions of x and y strain in the x and y directions are predetermined based on the machined features on the pin 2000, an example of which is described with reference to FIG. 4E.

In an embodiment, and as depicted in FIGS. 4A and 4C, the first outer surface 2010 of the support body 2000 has at least one strain focusing feature 2500 that allows the strain sensing electrical circuit 3000 to measure and transmit an electrical signal that is proportional to the load 6000 on the pin 2000. In an embodiment, the at least one strain focusing feature 2500 includes at least one partially circumferential rib 2510 formed on the first outer surface 2010 by an absence of material of the support body 2000 on each side of the at least one partially circumferential rib 2510. In an embodiment, the at least one partially circumferential rib 2510 comprises two circumferential ribs 2512, 2514, collectively flanked by mechanical ground surfaces 2522, 2524 provided on each end of the pin 2000. While certain forms of partially circumferential ribs 25112, 2514 in certain locations along the axis of the pin 2000 are depicted, it will be appreciated that these are example constructs only, and that an embodiment of an invention disclosed herein includes any and all forms of strain focusing features at any location(s) on the pin 2000 that would fall within the ambit of the appended claims.

Alternatively, and with particular reference to FIG. 4E, which is identical to that of FIG. 4C and provided herewith merely for clarity, the two circumferential ribs 2512, 2514 and the two mechanical ground surfaces 2522, 2524, of the pin 2000, can be described as follows. In succession from a first end 2006 of the pin 2000 to a second opposing end 2008 of the pin 2000, the first outer surface 2010 of the support body 2000 forms and defines: a $1^{st}$ region 2610 of the support body 2000 having a first outer radius 2710; a $2^{nd}$ region 2620 of the support body 2000 having a second outer radius 2720 that is less than the first outer radius 2710; a $3^{rd}$ region 2630 of the support body 2000 having the first outer radius 2710 that forms a first 2512 of the two circumferential ribs; a $4^{th}$ region 2640 of the support body 2000 having a third outer radius 2730 that is less than the first outer radius 2710; a $5^{th}$ region 2650 of the support body 2000 having the first outer radius 2710 that forms a second 2514 of the two circumferential ribs; a $6^{th}$ region 2660 of the support body 2000 having a fourth outer radius 2740 that is less than the first outer radius 2710; and, a $7^{th}$ region 2670 of the support body 2000 having the first out radius 2710.

In an embodiment, the fourth outer radius 2740 and the third outer radius 2730 are equal to the second outer radius 2720.

Figure 4E:
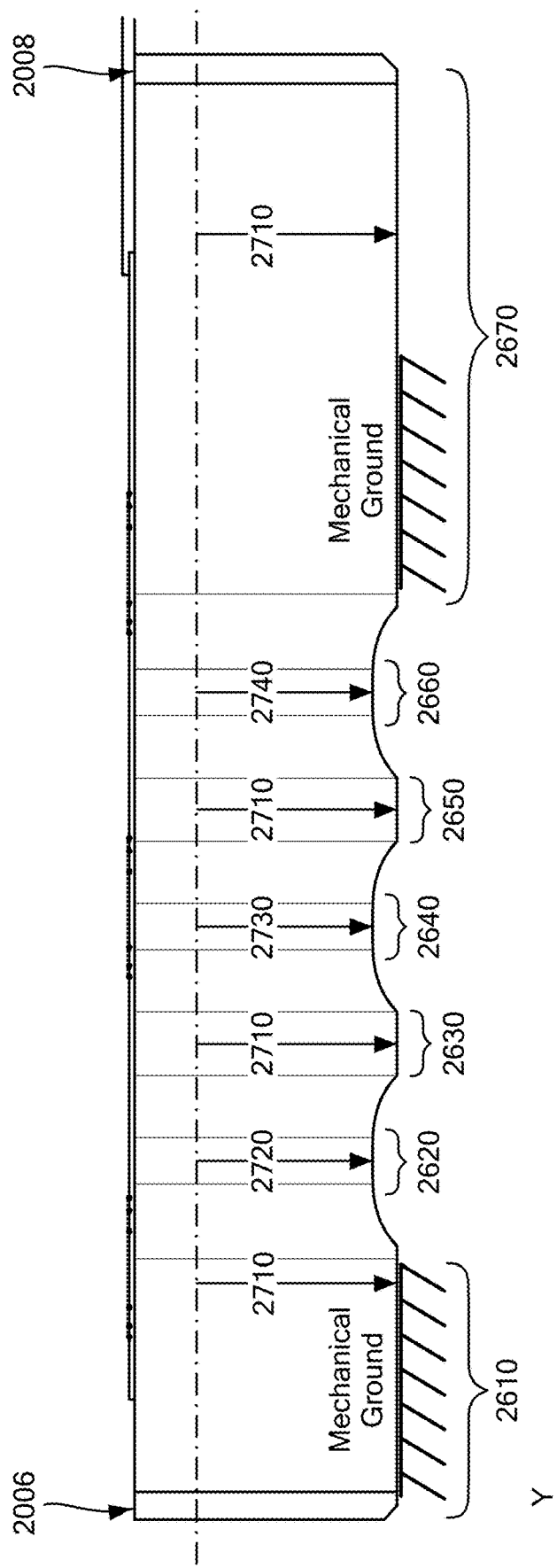

In an embodiment, the at least one strain sensing gauge 3010 of the strain sensing electrical circuit 3000 is disposed on the second outer surface 2020 (see FIG. 4A) in the $4^{th}$ region 2640 (see FIG. 4E).

With reference to FIG. 4A in combination with FIG. 4E, a force loading condition on the $3^{rd}$ and $5^{th}$ regions 2630, 2650 in a direction parallel to the second outer surface 2020, with the $1^{st}$ and $7^{th}$ regions 2610, 2670 mechanically grounded 2522, 2524, is referred to as an x-loading condition.

With reference to FIG. 4B in combination with FIG. 4E, a force loading condition on the $3^{rd}$ and $5^{th}$ regions 2630, 2650 in a direction perpendicular to the second outer surface 2020, with the $1^{st}$ and $7^{th}$ regions 2610, 2670 mechanically grounded 2522, 2524, is referred to as an y-loading condition.

Reference is now made to FIGS. 5A, 5B, 5C, 5D, 6A, 6B, 6C, and 6D, which in general depict finite element analysis data showing strain versus position over the second surface 2020 of an example pin 2000, and the strategic placement of a plurality of strain gauges 3010 (xR1, xR2, xR3, xR4, yR1, yR2, yR3, and yR4) on the second surface 2020 of the pin 2000.

The strain gauges 3010 are placed to measure the areas of maximum strain. This can be in the x direction, y direction, or a combination of x and y directions. When the strain gauges 3010 are placed in both the x and y strain areas, the magnitude of the sensor signal on each of these gauge's regions becomes a function of the force vector that is created in the assembly 1000 and measured with the pin 2000. The equations below are in reference to FIGS. 5A-5D and 6A-6D, described further below. These equations show how the strain profile corresponds to an electrical output. The electrical output Vo of a Wheatstone bridge is defined by the change in resistance of each resistor R in the bridge and the voltage applied Vin.

$$\frac{V_o}{V_{in}} = \left( \frac{\Delta R_1}{R_1} - \frac{\Delta R_2}{R_2} + \frac{\Delta R_3}{R_3} - \frac{\Delta R_4}{R_4} \right) \quad \text{Eq. 1}$$

The relationship between strain E and the change of resistance ΔR of is defined by:

$$\varepsilon_x \, k = \frac{\Delta R_x}{R_x} \quad \text{Eq. 2}$$

Where, k is predefined as a gauge factor, which is a material property of the strain gauge, and x is a designator for a particular resistor.

The relationship between strain on the resistors and the electrical output of the Wheatstone bridge can be described by:

$$\frac{V_o}{V_{in}} = \frac{k}{4}(\varepsilon_1 - \varepsilon_2 + \varepsilon_3 - \varepsilon_4) \quad \text{Eq. 3}$$

From Eqs. 1-3, it can be seen that the x and y bridges can be seen to have an output or have no output depending on the loading direction. The configuration of each bridge is sensitive only to one of the x-axis or the y-axis, as depicted in FIGS. 5A-6D for example, which will now be discussed in more detail.

Figure 5B:
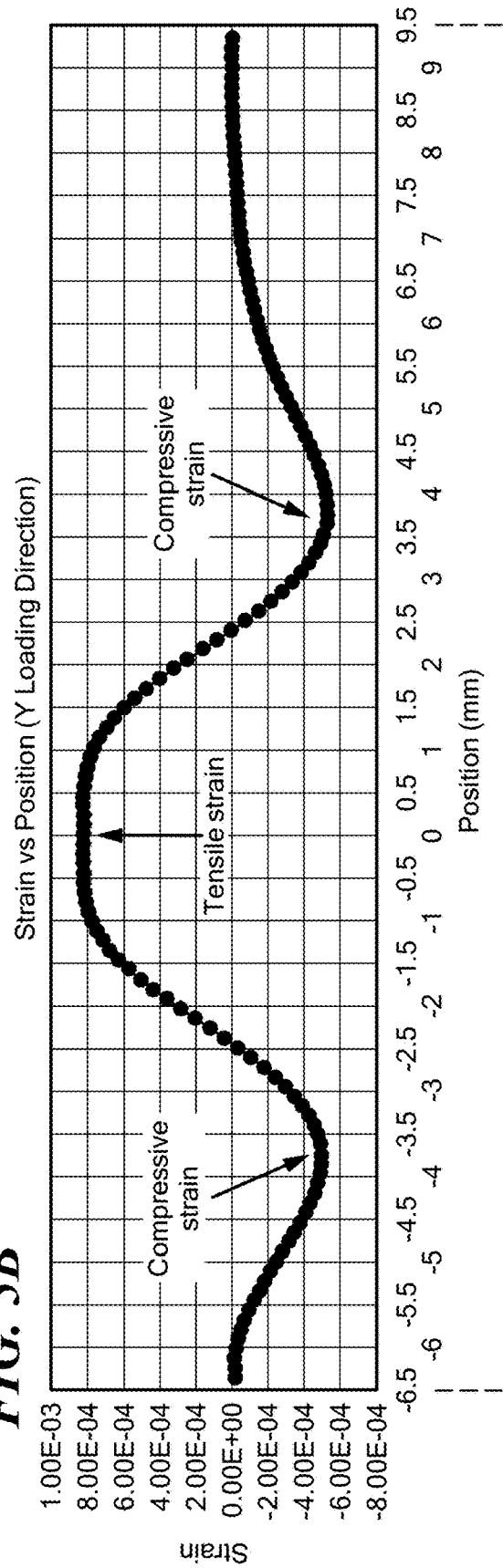
FIGS. 5A, 5B, 5C, and 5D, respectively depict: a top down plan view of the second surface of the instrumented pin sensor of FIG. 1A with a plurality of strain gauges strategically placed on the second surface; a plot of strain versus position along a length of the instrumented pin sensor of FIG. 5A with respect to a Y-loading condition on the instrumented pin sensor along the neutral axis line; a circuit illustration of Y-axis Wheatstone bridge strain gauges; and, a circuit illustration of X-axis Wheatstone bridge strain gauges, in accordance with an embodiment.
Figure 5A:
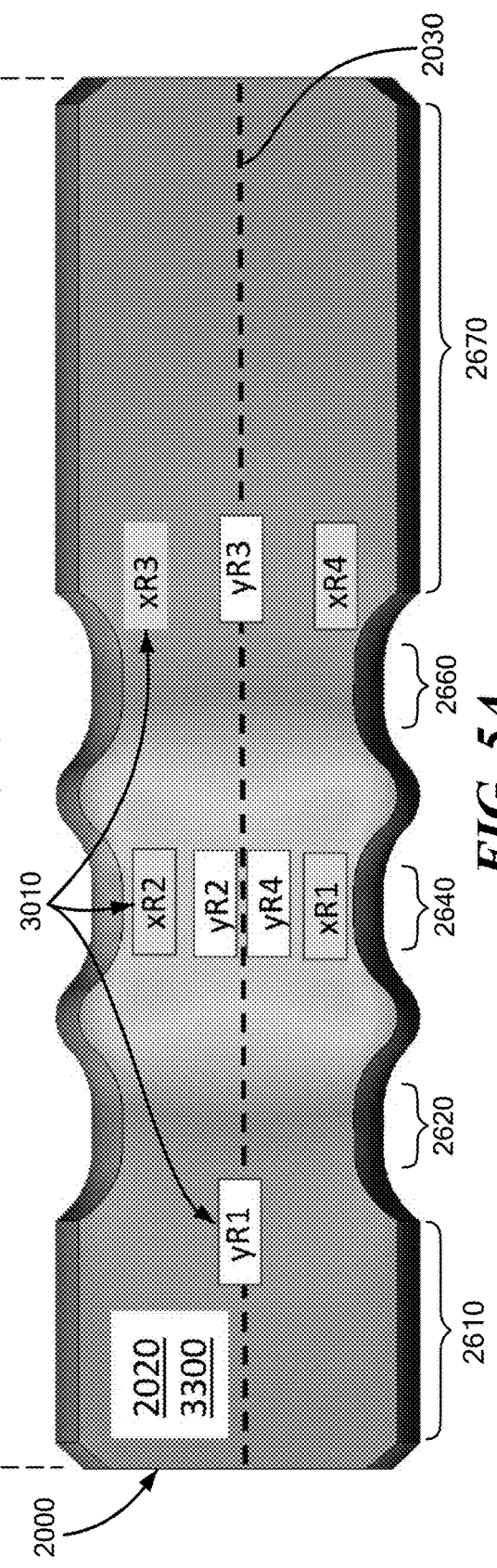
Figure 5D:
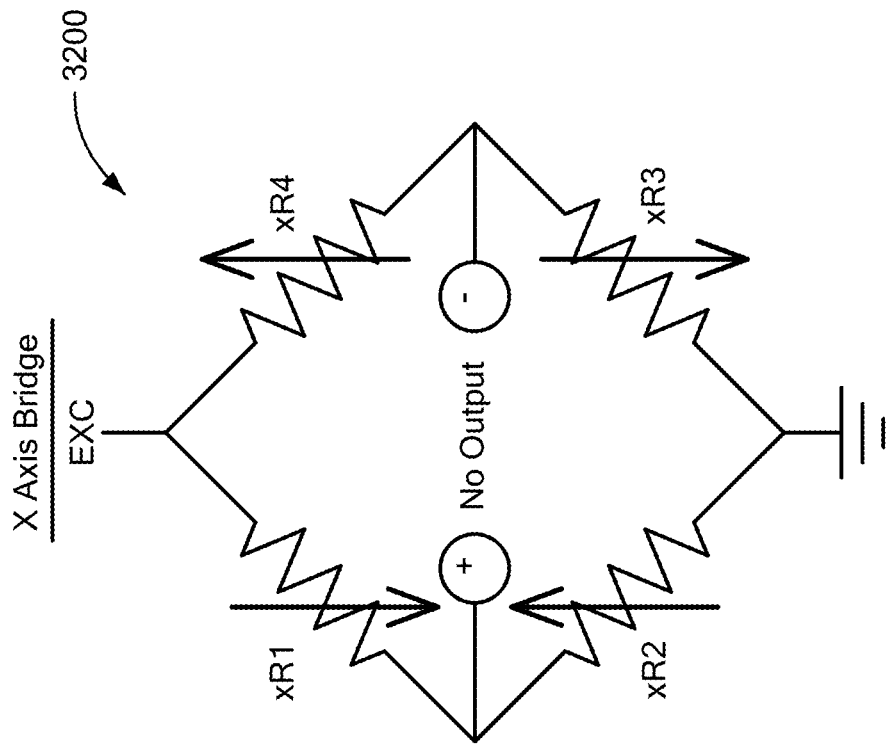
Figure 5C:
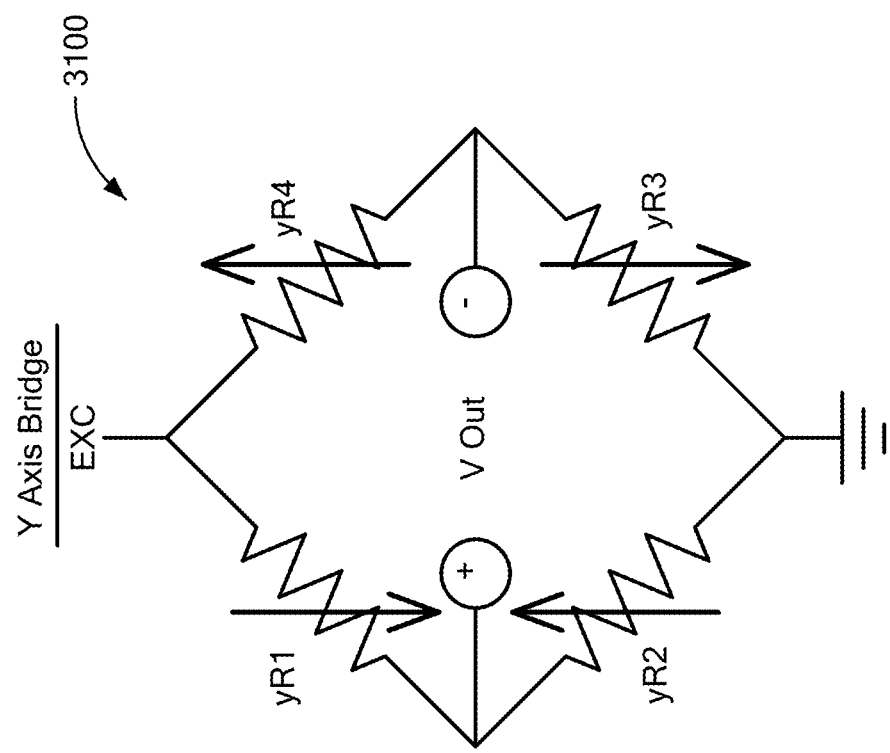

FIGS. 5A, 5B, 5C, and 5D, respectively depict: a top down plan view of the second surface 2020 of an example pin 2000 with a plurality of strain gauges 3010 strategically placed on the second surface 2020; a plot of strain versus position along a length of the pin 2000 depicted in FIG. 5A with respect to a Y-loading condition on the pin 2000 along the neutral axis line 2030 (the plot line); a circuit illustration 3100 of Y-axis Wheatstone bridge strain gauges 3010 (yR1, yR2, yR3, and yR4), designated accordingly, that do produce a voltage signal output consistent with the Y-loading condition on the pin 2000; and, a circuit illustration 3200 of X-axis Wheatstone bridge strain gauges 3010 (xR1, xR2, xR3, and xR4), designated accordingly, that do not produce a voltage signal output consistent with the Y-loading condition on the pin 2000.

The plot depicted in FIG. 5B illustrates that a Y-loading condition produces tensile strain in the $4^{th}$ region 2640, and compressive strain between the $1^{st}$ region 2610 and the $2^{nd}$ region 2620, and between the $6^{th}$ region 2660 and the $7^{th}$ region 2670. FIG. 5A depicts the strategic placement of the plurality of strain gauges 3010 (xR1, xR2, xR3, xR4, yR1, yR2, yR3, and yR4) on the second surface 2020 of the pin 2000, which correspond to the same strain gauges 3010 depicted in the circuit illustrations 3100, 3200 of FIGS. 5C and 5D.

Figure 6B:
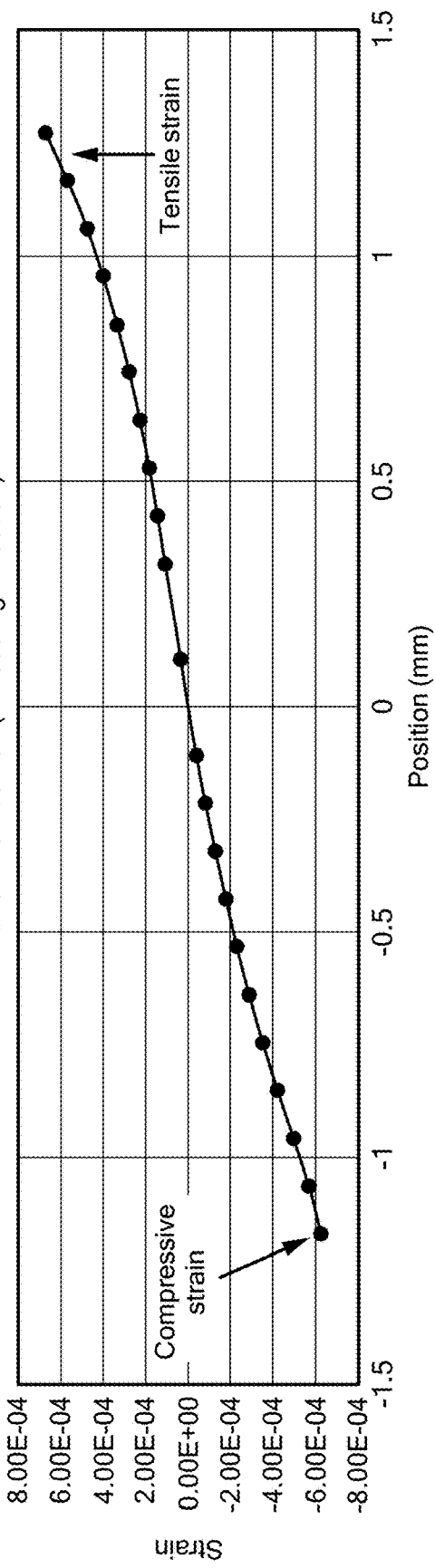
FIGS. 6A, 6B, 6C, and 6D, respectively depict: a top down plan view of the second surface of the instrumented pin sensor of FIG. 1A with a plurality of strain gauges strategically placed on the second surface; a plot of strain versus position across a width of the instrumented pin sensor of FIG. 6A with respect to an X-loading condition on the instrumented pin sensor along a plot line orthogonal to the neutral axis line; a circuit illustration of Y-axis Wheatstone bridge strain gauges; and, a circuit illustration of X-axis Wheatstone bridge strain gauges, in accordance with an embodiment.
Figure 6A:
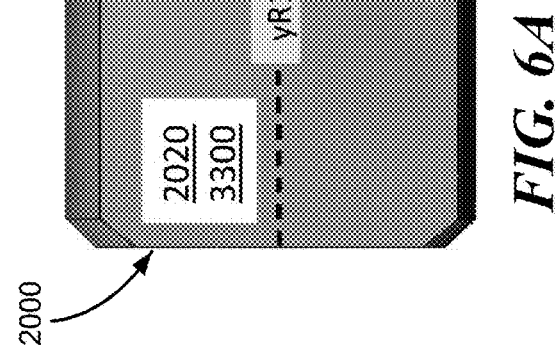
Figure 6D:
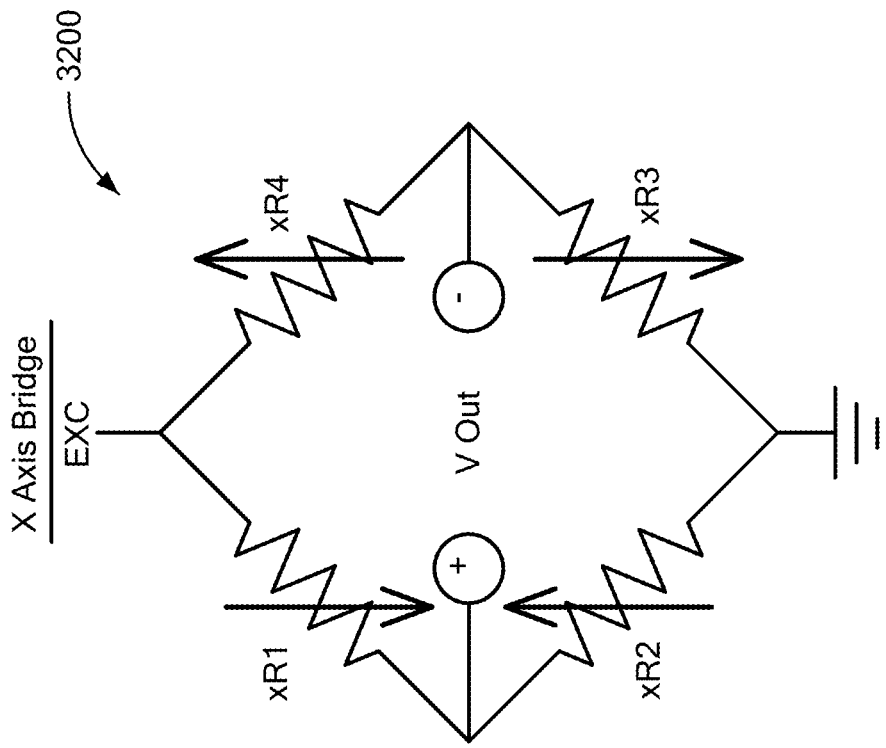
Figure 6C:
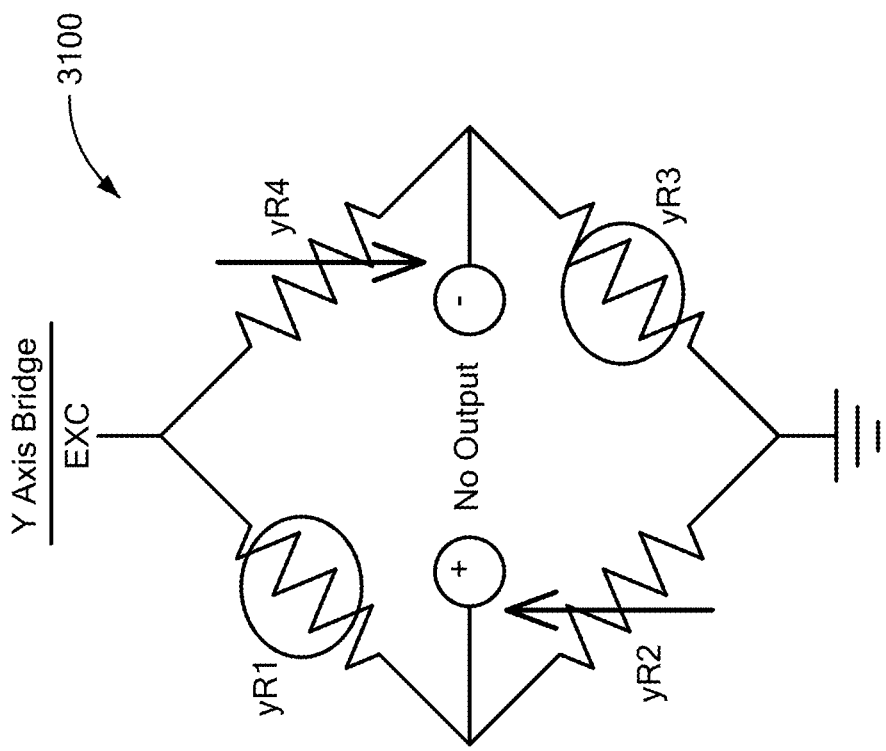

FIGS. 6A, 6B, 6C, and 6D, respectively depict: a top down plan view of the second surface 2020 of an example pin 2000 with a plurality of strain gauges 3010 strategically placed on the second surface 2020; a plot of strain versus position across a width of the pin 2000 depicted in FIG. 6A with respect to an X-loading condition on the pin 2000 along a plot line 2040 orthogonal to the neutral axis line 2030; a circuit illustration 3100 of Y-axis Wheatstone bridge strain gauges 3010 (yR1, yR2, yR3, and yR4), designated accordingly, that do not produce a voltage signal output consistent with the X-loading condition on the pin 2000; and, a circuit illustration 3200 of X-axis Wheatstone bridge strain gauges 3010 (xR1, xR2, xR3, and xR4), designated accordingly, that do produce a voltage signal output consistent with the X-loading condition on the pin 2000.

The plot depicted in FIG. 6B illustrates that an X-loading condition produces compressive strain xR1 that transitions to tensile strain at xR2, with zero strain at the neutral axis 2030. FIG. 6A depicts the strategic placement of the plurality of strain gauges 3010 (xR1, xR2, xR3, xR4, yR1, yR2, yR3, and yR4) on the second surface 2020 of the pin 2000, which correspond to the same strain gauges 3010 depicted in the circuit illustrations 3100, 3200 of FIGS. 6C and 6D.

While eight strain gauges 3010 (xR1, xR2, xR3, xR4, yR1, yR2, yR3, and yR4) are depicted in FIGS. 5A and 6A, it will be appreciated that an embodiment of an invention disclosed herein is not so limited. For example: the at least one strain sensing gauge 3010 may consist of just a single strain sensing gauge, such as yR2 for example, disposed in the $4^{th}$ region 2640; the at least one strain sensing gauge 3010 may consist of just two strain sensing gauges, such as xR1 and xR2 for example, disposed in the $4^{th}$ region 2640; or, the at least one strain sensing gauge 3010 may consist of just four strain sensing gauges, such as xR1, xR2, yR2, and yR4, for example, disposed in the $4^{th}$ region 2640.

In addition to the four strain sensing gauges xR1, xR2, yR2, and yR4, disposed in the $4^{th}$ region 2640, an embodiment of the instrumented pin sensor 1000 further includes: a fifth strain sensing gauge (yR1) disposed on the second outer surface 2020 between the $1^{st}$ region 2610 and the $2^{nd}$ region 2620; and, a sixth (xR3), a seventh (xR4), and an eighth (yR3), strain sensing gauge disposed on the second outer surface 2020 between the $6^{th}$ region 2660 and the r region 2670. In an embodiment, the first, second, third, fourth, fifth, sixth, seventh, and eighth, strain sensing gauges (xR1, xR2, xR3, xR4, yR1, yR2, yR3, and yR4) form two full Wheatstone bridges, an X-axis bridge and a Y-axis bridge.

As depicted in at least FIGS. 5A and 6A: the four strain sensing gauges disposed in the $4^{th}$ region are denoted by xR1, xR2, yR2, and yR4; the fifth strain sensing gauge disposed between the $1^{st}$ region and the $2^{nd}$ region is denoted by yR1; the sixth, seventh, and eighth, strain sensing gauges disposed between the $6^{th}$ region and the $7^{th}$ region are denoted by xR3, xR4, and yR3; wherein the "x" designation refers and relates to an x-axis loading condition; wherein the "y" designation refers and relates to ay-axis loading condition; and, wherein the "R1", "R2", "R3", and "R4" designations refer to particular resistors of the Wheatstone bridge.

In an embodiment, the strain sensing electrical circuit 3000 is in the form of a thin film strain gauge, which in an embodiment is coated with a moisture resistant seal 3300, wherein the plurality of electrical leads 4000 comprises at least two input leads and at least two output leads and the thin film strain gauge is electrically connected to the at least two input leads and the at least two output leads, and wherein: in a first instance prior to exposure of the instrumented pin sensor 1000 to an autoclave cycle, the electrical circuit 3000 is productive of a first output voltage on the output leads in response to a first input voltage on the input leads; and, in a second instance subsequent to exposure of the instrumented pin sensor 1000 to as many as 260 autoclave cycles, the electrical circuit 3000 is productive of a second output voltage on the output leads in response to a second input voltage on the input leads, the second input voltage being equal to the first input voltage, and the second output voltage being equal to or less than 40 µV/V smaller or larger than the first output voltage. In this embodiment, 40 µV/V equates to 2% of the full-scale output (FSO), 2 mV/V, of the strain sensing electrical circuit 3000. While a +/−40 µV/V offset shift is presently identified, it is contemplated from ongoing testing that +/−20 µV/V offset shift is achievable, 1% FSO in this embodiment. Based on ongoing testing and industry standard mean time between failure determination, it is expected, with a 95% confidence level, that the mean time between failure for a strain sensing electrical circuit 3000 larger than +/−40 µV/Voffset shift between the first output voltage and the second output voltage is 2440 autoclave cycles.

Reference is now made to FIGS. 7A, 7B, 8A, 8B, 8C, 9A, 9B, and 9C, which in general depict example applications of the instrumented pin sensor 1000.

Figure 7B:
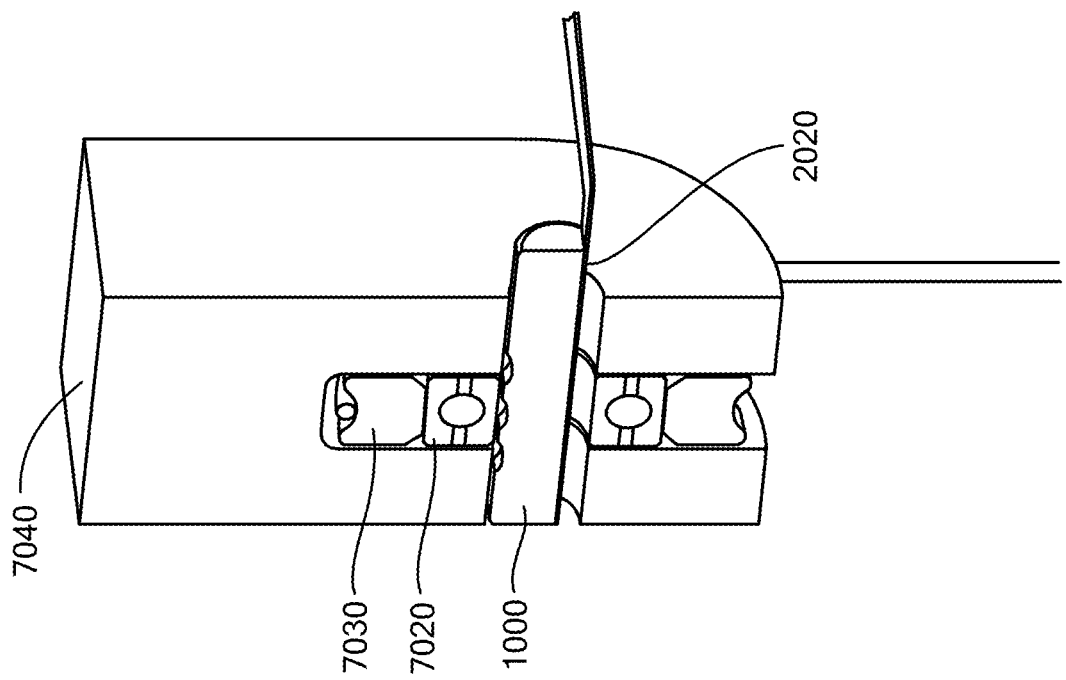
FIGS. 7A and 7B respectively depict a rotated isometric view, and a central axial cross section view, of a pully block assembly having the instrumented pin sensor of FIG. 1A, in accordance with an embodiment.
Figure 7A:
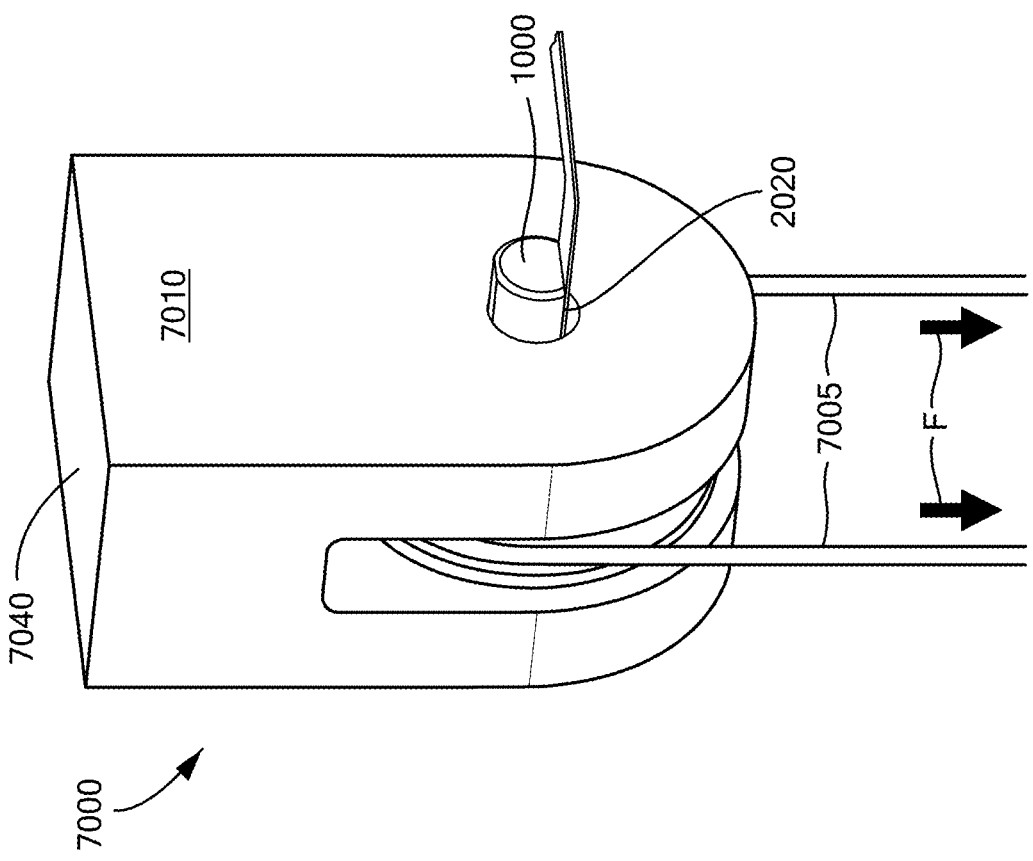

FIGS. 7A and 7B respectively depict a rotated isometric view, and a central axial cross section view, of a pully block assembly 7000 having an instrumented pin sensor 1000 with the second outer surface 2020 oriented downward or perpendicular to the line of force F acting on the pully block assembly 7000 via cables 7005. In addition to the instrumented pin sensor 1000, the pully block assembly 7000 includes a pulley block 7010, a pulley wheel bearing 7020, a pulley wheel sheave 7030 radially disposed about the bearing 7020, and the instrumented pin sensor 1000 that acts as a pivot pin of the pulley wheel bearing 7020 and the load bearing element of the pulley block assembly 7000, where in an embodiment the pully block assembly 7000 is restrained or grounded at the top planar surface 7040 of the pully block 7010. The loading here is similar to the loading depicted in FIG. 4C.

Figure 8C:
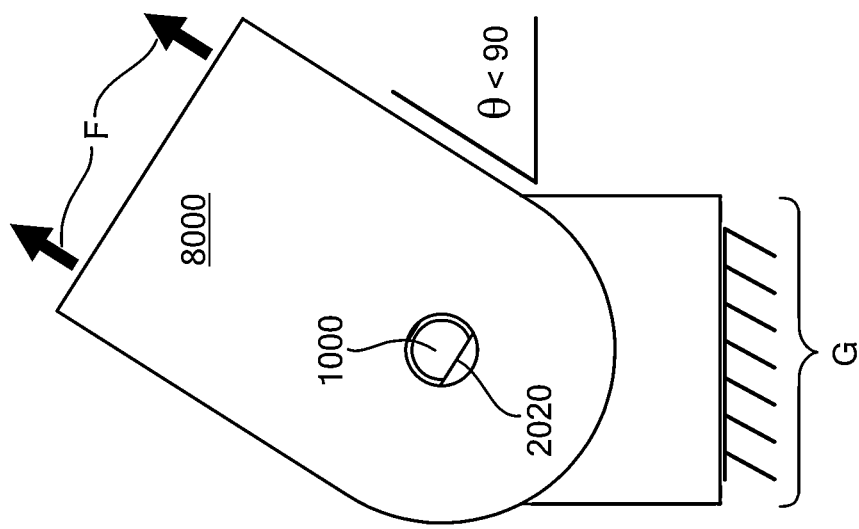
FIGS. 8A, 8B, and 8C, respectively depict axial side views of an articulating component having the instrumented pin sensor of FIG. 1A fixed relative to the articulating component, where a force vector F is oriented; at an angle θ>90-degrees relative to the x-axis a depicted in FIG. 8A, at an angle θ=90-degrees relative to the x-axis as depicted in FIG. 8B, and at an angle θ<90-degrees relative to the x-axis as depicted in FIG. 8C, in accordance with an embodiment.
Figure 8B:
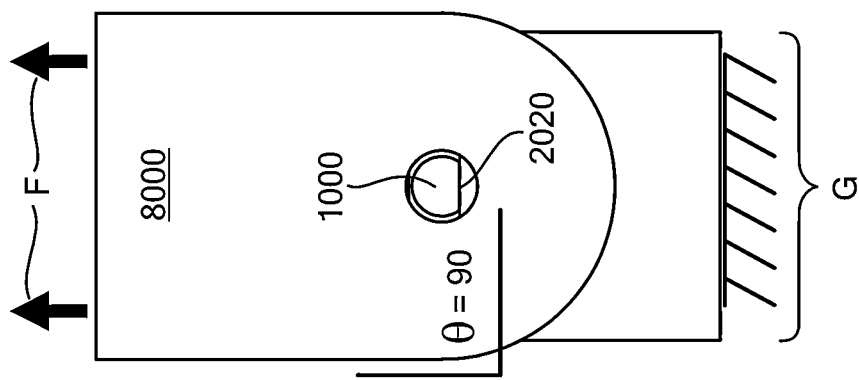
Figure 8A:
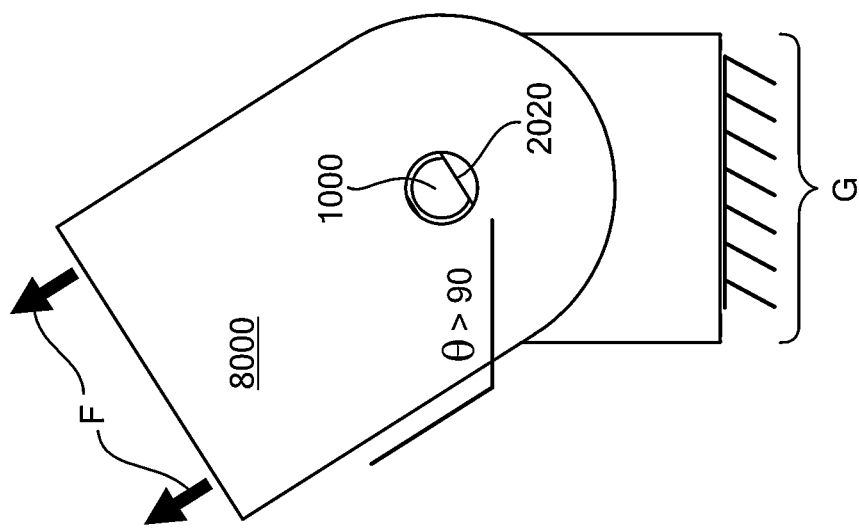

FIGS. 8A, 8B, and 8C, in general depict axial side views of an articulating instrumented pin sensor 1000 fixed relative to an articulating component 8000, and respectively depict the articulating component 8000 having a force vector F oriented at an angle θ>90-degrees relative to the x-axis, θ=90-degrees relative to the x-axis, and θ<90-degrees relative to the x-axis. Here, the instrumented pin sensor 1000 is a fixed component in series between the load F and ground G, and is configured, disposed, and oriented, to measure forces in-line with the articulating component 8000, that is, the second outer surface 2020 of the instrumented pin sensor 1000 remains perpendicular to the line of force F acting on the articulating component 8000 as the articulating component 8000 rotates about the instrumented pin sensor 1000, which similar to FIGS. 7A-7B acts as the pivot pin of the articulating component 8000. Where the load F articulates, the instrumented pin sensor 1000 follows. The instrumented pin sensor 1000 can be configured to measure a single axis where the magnitude of the load F, but not direction, can be resolved. Alternatively, a second strain gauge circuit 3000 can be added to the gauged second outer surface 2020 of the pin 2000 to measure dual axis component forces on the articulating member 8000.

Figure 9C:
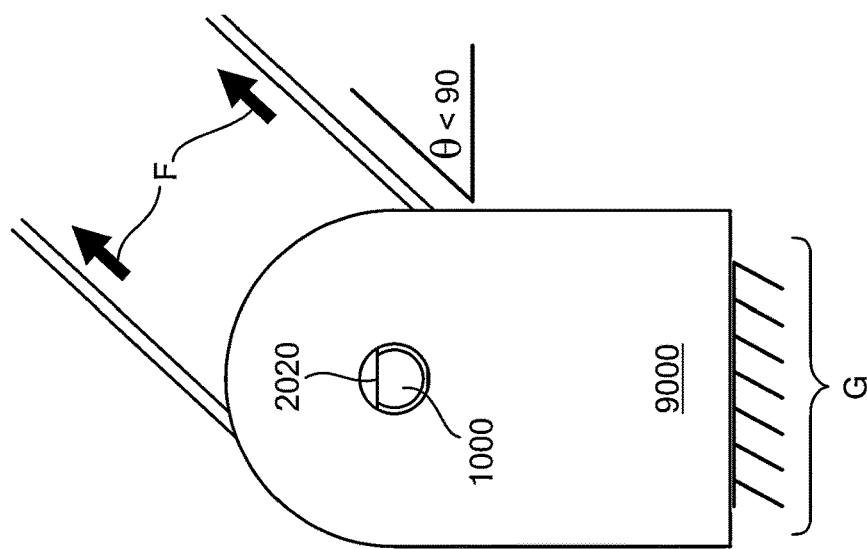
FIGS. 9A, 9B, and 9C, respectively depict axial side views of a loaded fixed instrumented pin sensor fixed relative to a non-articulating component and fixed relative to ground G, where the load F; is non-articulating as depicted in FIG. 9A, and where the load F is articulating as depicted in FIGS. 9B and 9C, in accordance with an embodiment.
Figure 9B:
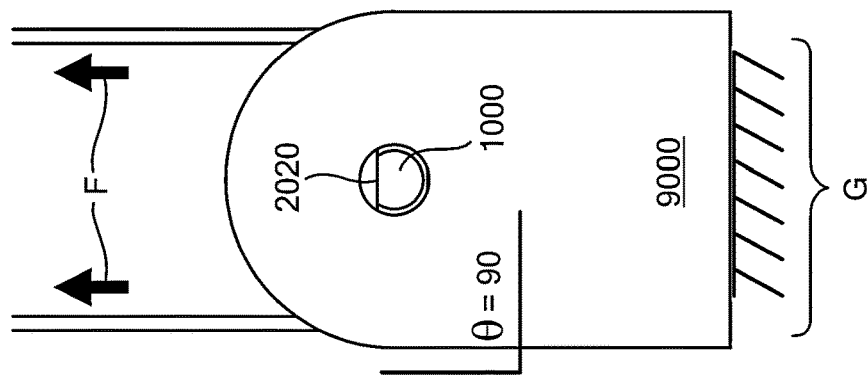
Figure 9A:
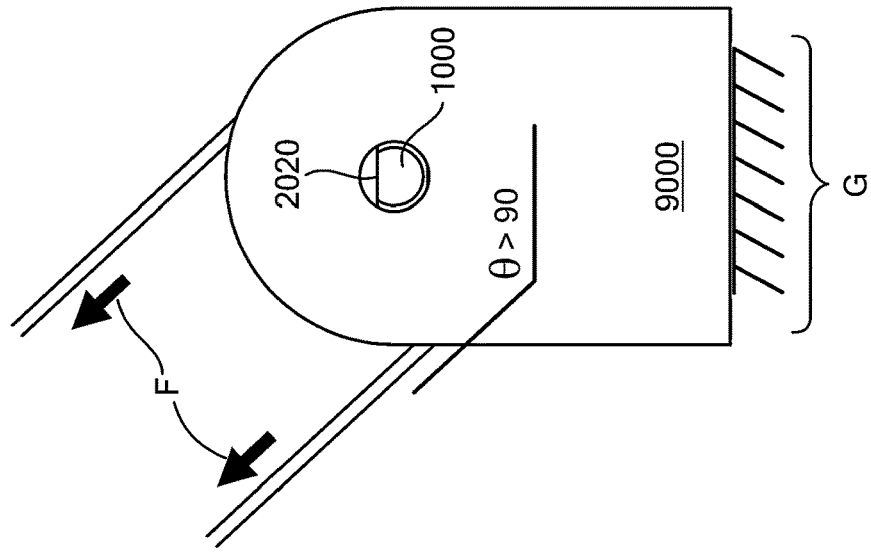

FIGS. 9A, 9B, and 9C, in general depict axial side views of a loaded fixed instrumented pin sensor 1000 fixed relative to a non-articulating component 9000 and fixed relative to ground G, where the load F is non-articulating as depicted in FIG. 9A, or where the load F is articulating as depicted in FIGS. 9B and 9C. In FIG. 9A, the instrumented pin sensor 1000 is a fixed component disposed in series between the load F and ground G, where the instrumented pin sensor 1000 is configured to measure strain in one axis. In FIGS. 9B and 9C, the instrumented pin sensor 1000 is a fixed component disposed in series between the load F and ground G, where the load F articulates around the instrumented pin sensor 1000, and where the instrumented pin sensor 1000 is disposed and configured with two full Wheatstone bridges, X-axis and Y-axis bridges, to measure the magnitude and direction of the load F relative to the respective x and y axes. By employing two full X-axis and Y-axis Wheatstone bridges, component forces can be resolved when the loading F is not perpendicular or parallel to the gauged second outer surface 2020.

While certain combinations of individual features have been described and illustrated herein, it will be appreciated that these certain combinations of features are for illustration purposes only and that any combination of any of such individual features may be employed in accordance with an embodiment, whether or not such combination is explicitly illustrated, and consistent with the disclosure herein. Any and all such combinations of features as disclosed herein are contemplated herein, are considered to be within the understanding of one skilled in the art when considering the application as a whole, and are considered to be within the scope of the invention disclosed herein, as long as they fall within the scope of the invention defined by the appended claims, in a manner that would be understood by one skilled in the art.

As disclosed herein, some embodiments may include some of the following advantages: use of thin film technology, such as thin film laser lithography, that can be employed to miniaturize, protect, and simplify the pin sensor; use of small gauged surfaces, that allows the end user to employ a miniaturized instrumented pin sensor; use of a thin film process that allows for the deposition of overlying passivation layers of inorganic materials such as silicon nitride and silicon dioxide to protect the pin sensor surface, where the inorganic materials are inherently more resistant to environmental degradation than organic encapsulants, and where the inorganic materials are applied during the thin film process, such that they are integral to the sensor and require no additional space or volume to accommodate; use of unique strain focusing features to induce specific bending and to concentrate strain in predetermined regions, with strategic arrangement of thin film strain gauges in the predetermined regions are wired together into Wheatstone bridges so as to resolve force vectors, which allows the instrumented pin sensor to determine total load regardless of load angle, and of resolving the load vector, that only requires sensors on a single surface; use of strain gauges on a single surface allows the instrumented pin sensor to be manufactured more simply than prior art sensors, where the size of the instrumented pin sensor can be further reduced over that of the prior art; utilization of a D-shaped or substantially D-shaped (see FIGS. 3A-3C) cross section for the pin of the instrumented pin sensor where the strain gauges are on a flat or substantially flat single surface reduces or eliminates the need for a complex assembly and gauging process of inserting strain gauges inside a protective tube, which allows for more precise placement of strain gauges, use of smaller strain gauges, use of smaller leadouts, and use of an hermetically sealed assembly desirable against harsh environments; and, utilization of a solid-bodied pin absent any through holes and/or a longitudinal bore, which reduces the burden of manufacturing, particularly for a miniaturized instrumented pin sensor.

While an invention has been described herein with reference to example embodiments, it will be understood by those skilled in the art that various changes may be made and equivalents may be substituted for elements thereof without departing from the scope of the claims. Many modifications may be made to adapt a particular situation or material to the teachings of the invention without departing from the essential scope thereof. Therefore, it is intended that the invention not be limited to the particular embodiment or embodiments disclosed herein as the best or only mode contemplated for carrying out this invention, but that the invention will include all embodiments falling within the scope of the appended claims. In the drawings and the description, there have been disclosed example embodiments and, although specific terms and/or dimensions may have been employed, they are unless otherwise stated used in a generic, exemplary and/or descriptive sense only and not for purposes of limitation, the scope of the claims therefore not being so limited. When an element such as a layer, film, region, substrate, or other described feature is referred to as being "on" or in "engagement with" another element, it can be directly on or engaged with the other element, or intervening elements may also be present. In contrast, when an element is referred to as being "directly on" or "directly engaged with" another element, there are no intervening elements present. The use of the terms first, second, etc. do not denote any order or importance, but rather the terms first, second, etc. are used to distinguish one element from another. The use of the terms a, an, etc. do not denote a limitation of quantity, but rather denote the presence of at least one of the referenced item. The use of the terms "top", "bottom", "up", "down", "left", "right", "front", "back", etc., or any reference to orientation, do not denote a limitation of structure, as the structure may be viewed from more than one orientation, but rather denote a relative structural relationship between one or more of the associated features as disclosed herein. The term "comprising" as used herein does not exclude the possible inclusion of one or more additional features. And, any background information provided herein is provided to reveal information believed by the applicant to be of possible relevance to the invention disclosed herein. No admission is necessarily intended, nor should be construed, that any of such background information constitutes prior art against an embodiment of the invention disclosed herein.

In view of all of the foregoing, it will be appreciated that various aspects of an embodiment are disclosed herein, which are in accordance with, but not limited to, at least the following aspects and/or combinations of aspects.

Aspect 1. An instrumented pin sensor, comprising: a support body in the form of a pin, the pin having an axial cross section that is only partially circular, forming a first outer surface with a profile that follows the partially circular axial cross section, and a second outer surface with a profile that does not follow the partially circular axial cross section; a strain sensing electrical circuit comprising at least one strain sensing gauge, the strain sensing electrical circuit fixedly disposed on the second outer surface of the support body; a plurality of electrical leads having a first end electrically connected to the strain sensing electrical circuit and fixedly attached the second outer surface of the support body, and a second end extending from the support body and being configured to provide electrical transmission of electrical signals from the strain sensing electrical circuit to an end user instrument; wherein the second outer surface runs the entire length of the support body with material of the support body only on an underside of the second outer surface.

Aspect 2. The instrumented pin sensor of Aspect 1, wherein: the second outer surface is planar.

Aspect 3. The instrumented pin sensor of Aspect 1, wherein: the second outer surface is not planar.

Aspect 4. The instrumented pin sensor of Aspect 3, wherein: the second outer surface has an axial cross section that is concave.

Aspect 5. The instrumented pin sensor of Aspect 3, wherein: the second outer surface has an axial cross section that is convex.

Aspect 6. The instrumented pin sensor of any one of Aspects 1 to 5, wherein: the first outer surface of the support body comprises at least one strain focusing feature that allows the strain sensing electrical circuit to measure and transmit an electrical signal that is proportional to the load on the pin.

Aspect 7. The instrumented pin sensor of Aspect 6, wherein: the at least one strain focusing feature comprises at least one partially circumferential rib formed on the first outer surface by an absence of material of the support body on each side of the at least one partially circumferential rib.

Aspect 8. The instrumented pin sensor of Aspect 7, wherein: the at least one partially circumferential rib comprises two circumferential ribs.

Aspect 9. The instrumented pin sensor of any one of Aspects 1 to 8, wherein: in succession from a first end of the pin to a second opposing end of the pin, the first outer surface of the support body defines: a $1^{st}$ region of the support body having a first outer radius; a $2^{nd}$ region of the support body having a second outer radius that is less than the first outer radius; a $3^{rd}$ region of the support body having the first outer radius that forms a first of the two circumferential ribs; a $4^{th}$ region of the support body having a third outer radius that is less than the first outer radius; a $5^{th}$ region of the support body having the first outer radius that form a second of the two circumferential ribs; a $6^{th}$ region of the support body having a fourth outer radius that is less than the first outer radius; and, a $7^{th}$ region of the support body having the first out radius.

Aspect 10. The instrumented pin sensor of Aspect 9: wherein the fourth outer radius and the third outer radius are equal to the second outer radius.

Aspect 11. The instrumented pin sensor of any one of Aspects 9 to 10, wherein: the at least one strain sensing gauge of the strain sensing electrical circuit is disposed on the second outer surface in the $4^{th}$ region.

Aspect 12. The instrumented pin sensor of any one of Aspects 9 to 11, wherein: the at least one strain sensing gauge disposed in the fourth region consists of a single strain sensing gauge.

Aspect 13. The instrumented pin sensor of any one of Aspects 9 to 11, wherein: the at least one strain sensing gauge disposed in the fourth region consists of two strain sensing gauges.

Aspect 14. The instrumented pin sensor of any one of Aspects 9 to 11, wherein: the at least one strain sensing gauge disposed in the fourth region consists of four strain sensing gauges.

Aspect 15. The instrumented pin sensor of Aspect 14, wherein: a fifth strain sensing gauge of the at least one strain sensing gauge is disposed on the second outer surface between the $1^{st}$ region and the $2^{nd}$ region; and, a sixth, a seventh, and an eighth, strain sensing gauge of the at least one strain sensing gauge are disposed on the second outer surface between the $6^{th}$ region and the $7^{th}$ region.

Aspect 16. The instrumented pin sensor of Aspect 15, wherein: the first, second, third, fourth, fifth, sixth, seventh, and eighth, strain sensing gauges form a full Wheatstone bridge.

Aspect 17. The instrumented pin sensor of Aspect 16, wherein: the four strain sensing gauges disposed in the 4th region are denoted by xR1, xR2, yR2, and yR4; the fifth strain sensing gauge disposed between the $1^{st}$ region and the $2^{nd}$ region is denoted by yR1; the sixth, seventh, and eighth, strain sensing gauges disposed between the 6th region and the 7th region are denoted by xR3, xR4, and yR3; the "x" designation refers and relates to an x-axis loading condition; the "y" designation refers and relates to a y-axis loading condition; and, the "R1", "R2", "R3", and "R4" designations refer to particular resistors of the Wheatstone bridge.

Aspect 18. The instrumented pin sensor of any one of Aspects 9 to 15, wherein: a force loading condition on the $3^{rd}$ and $5^{th}$ regions in a direction parallel to the second outer surface, with the $1^{st}$ and $7^{th}$ regions mechanically grounded, is referred to as an x-loading condition.

Aspect 19. The instrumented pin sensor of any one of Aspects 9 to 15, wherein: a force loading condition on the $3^{rd}$ and $5^{th}$ regions in a direction perpendicular to the second outer surface, with the $1^{st}$ and $7^{th}$ regions mechanically grounded, is referred to as an y-loading condition.

Aspect 20. The instrumented pin sensor of Aspect 16, wherein: a force loading condition on the $3^{rd}$ and $5^{th}$ regions in a direction parallel to the second outer surface, with the $1^{st}$ and $7^{th}$ regions mechanically grounded, is referred to as an x-loading condition.

Aspect 21. The instrumented pin sensor of Aspect 16, wherein: a force loading condition on the $3^{rd}$ and $5^{th}$ regions in a direction perpendicular to the second outer surface, with the $1^{st}$ and $7^{th}$ regions mechanically grounded, is referred to as an y-loading condition.

Aspect 22. The instrumented pin sensor of any one of Aspects 1 to 21, wherein: the first outer surface with the profile that follows the partially circular axial cross section is formed by an angle of arc, as observed in the axial cross section, that is greater than 180-degrees.

Aspect 23. The instrumented pin sensor of any one of Aspects 1 to 22, wherein: the strain sensing electrical circuit comprises a thin film strain gauge.

Aspect 24. The instrumented pin sensor of Aspect 23, wherein: the thin film strain gauge is coated with a moisture resistant seal.

Aspect 25. The instrumented pin sensor of Aspect 24, wherein: the plurality of electrical leads comprises at least two input leads and at least two output leads; the thin film strain gauge is electrically connected to the at least two input leads and the at least two output leads; in a first instance prior to exposure of the instrumented pin sensor to an autoclave cycle, the electrical circuit is productive of a first output voltage on the output leads in response to a first input voltage on the input leads; and, in a second instance subsequent to exposure of the instrumented pin sensor to as many as 260 autoclave cycles, the electrical circuit is productive of a second output voltage on the output leads in response to a second input voltage on the input leads, the second input voltage being equal to the first input voltage, and the second output voltage being equal to or less than 40 µV/V smaller or larger than the first output voltage.

Aspect 26. The instrumented pin sensor of any one of Aspects 1 to 25 wherein: each one of the at least one strain sensing gauge of the strain sensing electrical circuit is disposed only on the second outer surface.

Aspect 27. The instrumented pin sensor of any one of Aspects 1 to 26, wherein: the support body is a solid-bodied pin absent any through holes or a longitudinal bore.

The invention claimed is:

1. An instrumented pin sensor, comprising:
    a support body in the form of a pin, the pin having an axial cross section that is only partially circular, forming a first outer surface with a profile that follows the partially circular axial cross section, and a second outer surface with a profile that does not follow the partially circular axial cross section;
    a strain sensing electrical circuit comprising at least one strain sensing gauge, the strain sensing electrical circuit fixedly disposed on the second outer surface of the support body;
    a plurality of electrical leads having a first end electrically connected to the strain sensing electrical circuit and fixedly attached to the second outer surface of the support body, and a second end extending from the support body and being configured to provide electrical transmission of electrical signals from the strain sensing electrical circuit to an end user instrument;
    wherein the second outer surface runs the entire length of the support body with material of the support body only on an underside of the second outer surface.

2. The instrumented pin sensor of claim 1, wherein: the second outer surface is planar.

3. The instrumented pin sensor of claim 1, wherein:
the second outer surface is not planar.

4. The instrumented pin sensor of claim 3, wherein:
the second outer surface has an axial cross section that is concave.

5. The instrumented pin sensor of claim 3, wherein:
the second outer surface has an axial cross section that is convex.

6. The instrumented pin sensor of claim 1, wherein:
the first outer surface of the support body comprises at least one strain focusing feature that allows the strain sensing electrical circuit to measure and transmit an electrical signal that is proportional to a load on the pin.

7. The instrumented pin sensor of claim 6, wherein:
the at least one strain focusing feature comprises at least one partially circumferential rib formed on the first outer surface by an absence of material of the support body on each side of the at least one partially circumferential rib.

8. The instrumented pin sensor of claim 7, wherein:
the at least one partially circumferential rib comprises two circumferential ribs.

9. The instrumented pin sensor of claim 8, wherein:
in succession from a first end of the pin to a second opposing end of the pin, the first outer surface of the support body defines:
a $1^{st}$ region of the support body having a first outer radius;
a $2^{nd}$ region of the support body having a second outer radius that is less than the first outer radius;
a $3^{rd}$ region of the support body having the first outer radius that forms a first of the two circumferential ribs;
a $4^{th}$ region of the support body having a third outer radius that is less than the first outer radius;
a $5^{th}$ region of the support body having the first outer radius that form a second of the two circumferential ribs;
a $6^{th}$ region of the support body having a fourth outer radius that is less than the first outer radius; and
a $7^{th}$ region of the support body having the first outer radius.

10. The instrumented pin sensor of claim 9:
wherein the fourth outer radius and the third outer radius are equal to the second outer radius.

11. The instrumented pin sensor of claim 10, wherein:
the at least one strain sensing gauge of the strain sensing electrical circuit is disposed on the second outer surface in the $4^{th}$ region.

12. The instrumented pin sensor of claim 11, wherein:
the at least one strain sensing gauge disposed in the $4^{th}$ region consists of a single strain sensing gauge.

13. The instrumented pin sensor of claim 11, wherein:
the at least one strain sensing gauge disposed in the $4^{th}$ region consists of two strain sensing gauges.

14. The instrumented pin sensor of claim 11, wherein:
the at least one strain sensing gauge disposed in the $4^{th}$ region consists of four strain sensing gauges.

15. The instrumented pin sensor of claim 14, wherein:
a fifth strain sensing gauge of the at least one strain sensing gauge is disposed on the second outer surface between the $1^{st}$ region and the $2^{nd}$ region;
a sixth, a seventh, and an eighth, strain sensing gauge of the at least one strain sensing gauge are disposed on the second outer surface between the $6^{th}$ region and the $7^{th}$ region.

16. The instrumented pin sensor of claim 15, wherein:
the first, second, third, fourth, fifth, sixth, seventh, and eighth, strain sensing gauges form a full Wheatstone bridge.

17. The instrumented pin sensor of claim 16, wherein:
the four strain sensing gauges disposed in the $4^{th}$ region are denoted by xR1, xR2, yR2, and yR4;
the fifth strain sensing gauge disposed between the $1^{st}$ region and the $2^{nd}$ region is denoted by yR1;
the sixth, seventh, and eighth, strain sensing gauges disposed between the $6^{th}$ region and the $7^{th}$ region are denoted by xR3, xR4, and yR3;
the "x" designation refers and relates to an x-axis loading condition;
the "y" designation refers and relates to a y-axis loading condition; and
the "R1", "R2", "R3", and "R4" designations refer to particular resistors of the Wheatstone bridge.

18. The instrumented pin sensor of claim 16, wherein:
a force loading condition on the $3^{rd}$ and $5^{th}$ regions in a direction parallel to the second outer surface, with the $1^{st}$ and $7^{th}$ regions mechanically grounded, is referred to as an x-loading condition.

19. The instrumented pin sensor of claim 16, wherein:
a force loading condition on the $3^{rd}$ and $5^{th}$ regions in a direction perpendicular to the second outer surface, with the $1^{st}$ and $7^{th}$ regions mechanically grounded, is referred to as an y-loading condition.

20. The instrumented pin sensor of claim 9, wherein:
a force loading condition on the $3^{rd}$ and $5^{th}$ regions in a direction parallel to the second outer surface, with the $1^{st}$ and $7^{th}$ regions mechanically grounded, is referred to as an x-loading condition.

21. The instrumented pin sensor of claim 9, wherein:
a force loading condition on the $3^{rd}$ and $5^{th}$ regions in a direction perpendicular to the second outer surface, with the $1^{st}$ and $7^{th}$ regions mechanically grounded, is referred to as an y-loading condition.

22. The instrumented pin sensor of claim 1, wherein:
the first outer surface with the profile that follows the partially circular axial cross section is formed by an angle of arc, as observed in the axial cross section, that is greater than 180-degrees.

23. The instrumented pin sensor of claim 1, wherein:
the strain sensing electrical circuit comprises a thin film strain gauge.

24. The instrumented pin sensor of claim 23, wherein:
the thin film strain gauge is coated with a moisture resistant seal.

25. The instrumented pin sensor of claim 24, wherein:
the plurality of electrical leads comprises at least two input leads and at least two output leads;
the thin film strain gauge is electrically connected to the at least two input leads and the at least two output leads;
in a first instance prior to exposure of the instrumented pin sensor to an autoclave cycle, the electrical circuit is productive of a first output voltage on the output leads in response to a first input voltage on the input leads; and
in a second instance subsequent to exposure of the instrumented pin sensor to as many as 260 autoclave cycles, the electrical circuit is productive of a second output voltage on the output leads in response to a second input voltage on the input leads, the second input voltage being equal to the first input voltage, and the second output voltage being equal to or less than 40 µV/V smaller or larger than the first output voltage.

26. The instrumented pin sensor of claim 1 wherein:
each one of the at least one strain sensing gauge of the strain sensing electrical circuit is disposed only on the second outer surface.

27. The instrumented pin sensor of claim 1, wherein:
the support body is a solid-bodied pin absent any through holes or a longitudinal bore.

28. An instrumented pin sensor, comprising:
a support body in the form of a pin, the pin having an axial cross section that is only partially circular, forming a first outer surface with a profile that follows the partially circular axial cross section, and a second outer surface with a profile that does not follow the partially circular axial cross section;
a strain sensing electrical circuit comprising at least one strain sensing gauge, the strain sensing electrical circuit fixedly disposed on the second outer surface of the support body;
a plurality of electrical leads having a first end electrically connected to the strain sensing electrical circuit and fixedly attached to the second outer surface of the support body, and a second end extending from the support body and being configured to provide electrical transmission of electrical signals from the strain sensing electrical circuit to an end user instrument;
wherein the second outer surface runs the entire length of the support body with material of the support body only on an underside of the second outer surface;
wherein the support body of the pin has a first end and a second opposing end that are both disposed and configured to be mechanically grounded;
wherein the support body of the pin has a first circumferential rib and a second circumferential rib separated from the first circumferential rib;
wherein the first and the second circumferential ribs are disposed between the first and second ends of the support body of the pin; and
wherein the first and the second circumferential ribs are both disposed and configured to act as strain focusing features to induce specific bending and to concentrate strain in predetermined regions.

* * * * *